(12) United States Patent
Hotta et al.

(10) Patent No.: US 6,471,611 B1
(45) Date of Patent: Oct. 29, 2002

(54) AUTO-TENSIONER

(75) Inventors: Koji Hotta, Aichi-ken (JP); Hirohito Terashima, Aichi-ken (JP); Katsumi Hirabayashi, Aichi-ken (JP)

(73) Assignee: Aisin Seiki Kabushiki Kaisha, Aichi-Pref (JP)

( * ) Notice: Subject to any disclaimer, the term of this patent is extended or adjusted under 35 U.S.C. 154(b) by 0 days.

(21) Appl. No.: 09/394,042

(22) Filed: Sep. 13, 1999

(30) Foreign Application Priority Data

| Sep. 11, 1998 | (JP) | ............................................ 10-257401 |
| Nov. 16, 1998 | (JP) | ............................................ 10-324939 |
| Jun. 29, 1999 | (JP) | ............................................ 11-183850 |

(51) Int. Cl.$^7$ ................................................ F16H 7/08
(52) U.S. Cl. ................................................ 474/109
(58) Field of Search ........................... 474/110, 133, 474/109, 112, 113, 135, 138

(56) References Cited

U.S. PATENT DOCUMENTS

| 4,473,362 A | 9/1984 | Thomey et al. | |
| 4,808,148 A | 2/1989 | Holtz | |
| 4,940,447 A | 7/1990 | Kawashima et al. | |
| 5,383,813 A | 1/1995 | Odai | |
| 5,637,047 A | * 6/1997 | Schulze | ...................... 474/110 |
| 5,653,651 A | * 8/1997 | Kawashima et al. | ......... 474/110 |
| 5,785,619 A | * 7/1998 | Nakakubo et al. | .......... 474/109 |
| 5,833,563 A | * 11/1998 | Takeda et al. | .............. 474/138 |

FOREIGN PATENT DOCUMENTS

| DE | 42 42 292 A1 | 12/1992 |
| DE | 44 22 445 A1 | 6/1994 |
| DE | 196 15 031 A1 | 4/1996 |
| GB | 2 262 582 A | 12/1992 |
| JP | 5-38442 | 5/1925 |

* cited by examiner

Primary Examiner—Thomas R. Hannon
Assistant Examiner—Vicky A. Johnson

(57) ABSTRACT

In an auto-tensioner, a damping device is used to control a fluid communication between a first fluid chamber and a second chamber for adjusting an engagement of an idler pulley with a belt-shaped power transmission member in such a manner that when a tension thereof is decreased, a quick propulsive movement of the idler pulley to the belt-shaped power transmission member is allowed by the first urging member, while when the tension is increased, the idler pulley is retracted gradually from the belt-shaped power transmission member by a registration of the belt-shaped power transmission member.

14 Claims, 7 Drawing Sheets

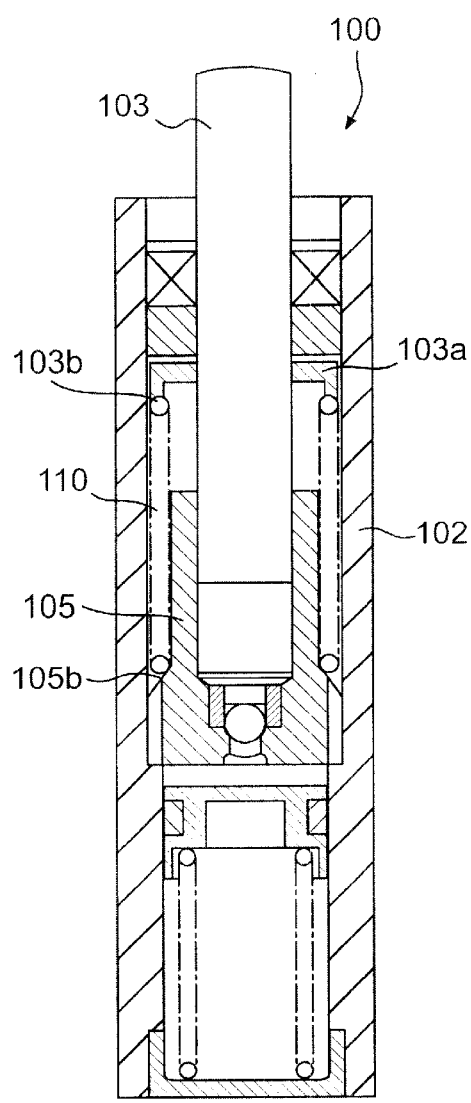
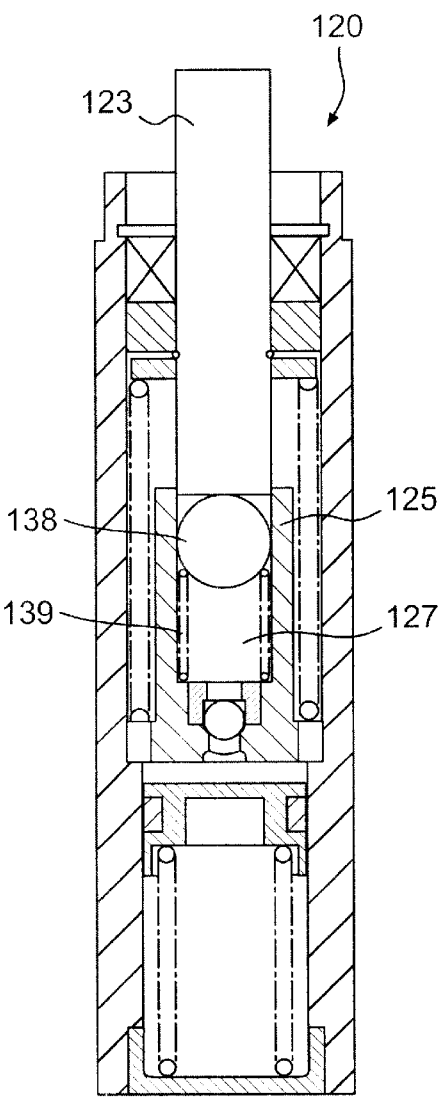
FIG. 9　　　　FIG. 10

AUTO-TENSIONER

BACKGROUND OF THE INVENTION

1. Field of the Invention

The present invention is directed to an auto-tensioner which provides an adequate tension to an engine timing-belt for reducing noise therefrom and improving life thereof and, more particularly, to a so-called free piston type auto-tensioner having a body in which a piston is moved.

2. Description of the Prior Art

Japanese Utility Model Laid-open Print No. Hei.5-38422, published on May 25, 1993, without examination, discloses a conventional auto-tensioner. This auto-tensioner has a rod which extends from a body and is in engagement with an engine timing belt. In the body, the rod is configured to an enlarged portion which is slidably mounted on a sleeve fixed to the body. A pressure chamber which is filled with an amount of fluid is defied between the sleeve and the rod. To establish the foregoing engagement of the rod with the engine timing belt, the auto-tensioner is installed in an engine compartment of a vehicle body in such a manner that the rod is brought into upstanding or upright condition.

Under the resultant arrangement, in the event of the unexpected existence of one or more air bubbles in the pressure chamber, the upward movement of each air bubble is prevented by collision thereof with the rod. This means that the air bubbles remain in the pressure chamber, thereby disturbing the damping function of the rod; that is to say, the designed operation of the auto-tensioner fails to function.

Accordingly, a need exists for an auto-tensioner without the foregoing drawback.

SUMMARY OF THE INVENTION

The present invention has been developed to satisfy the need noted above and thus has as a primary object the provision of a free piston type auto-tensioner for providing a continual adequate tension to a belt-shaped power transmission member which comprises:

a cylindrical body;

a rod fitted in the body so as to be moved back and forth along its axial direction, extending outside the body so as to urge the belt-shaped power transmission member via an idler pulley;

a block placed in the body and having one end portion and the other end portion, one end portion of the block receiving the rod movably and defining therein a first fluid chamber together with the rod for storing a fluid, the other end portion defining a second fluid chamber together with a movable piston, the block being provided with a fluid passage connected between the first fluid chamber and the second fluid chamber;

a first urging member formed into a hollow configuration and urging the rod to extend the same outside the body;

a second urging member formed into a cylindrical configuration and urging the piston for increasing pressure in the second fluid chamber;

damping means controlling a fluid communication between the first fluid chamber and the second chamber for adjusting an engagement of the idler pulley with the belt-shaped power transmission member in such a manner that when a tension thereof is decreased, a quick propulsive movement of the idler pulley to the belt-shaped power transmission member is allowed by the first urging member, while when the tension is increased, the idler pulley is retracted gradually from the belt-shaped power transmission member by a registration of the belt-shaped power transmission member.

BRIEF DESCRIPTION OF THE DRAWINGS

The above and other objects, features and advantages of the present invention will be more apparent and more readily appreciated from the following detailed description of preferred exemplary embodiments of the present invention, taken in connection with the accompanying drawings, in which:

FIG. 9 is a cross-sectional view of an auto-tensioner of a sixth embodiment of the present invention; and FIG. 10 is a cross-sectional view of an auto-tensioner of a seventh embodiment of the present invention.

DETAILED DESCRIPTION OF THE PRESENT INVENTION

Preferred embodiments of the present invention will be described hereinafter in detail with reference to the accompanying drawings.

Figure 1:
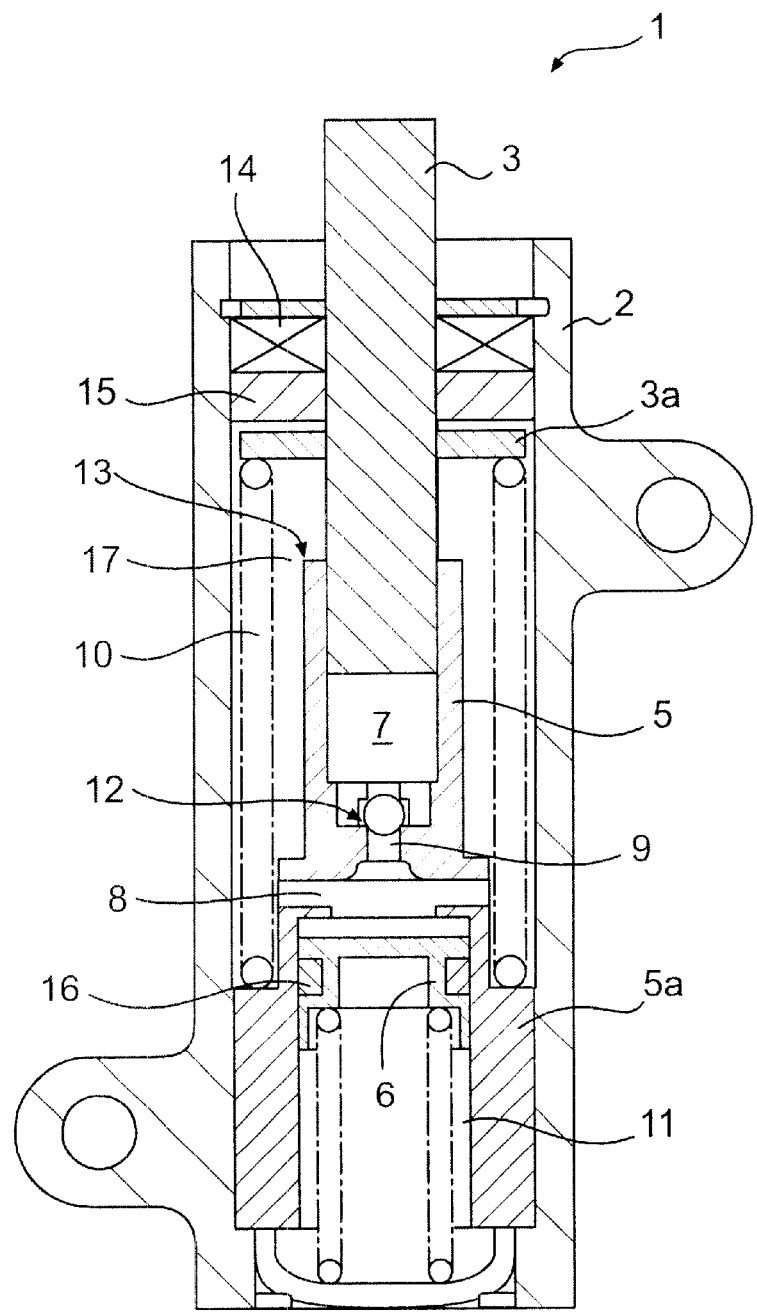
FIG. 1 is a cross-sectional view of an auto-tensioner of a first embodiment of the present invention.
Figure 2:
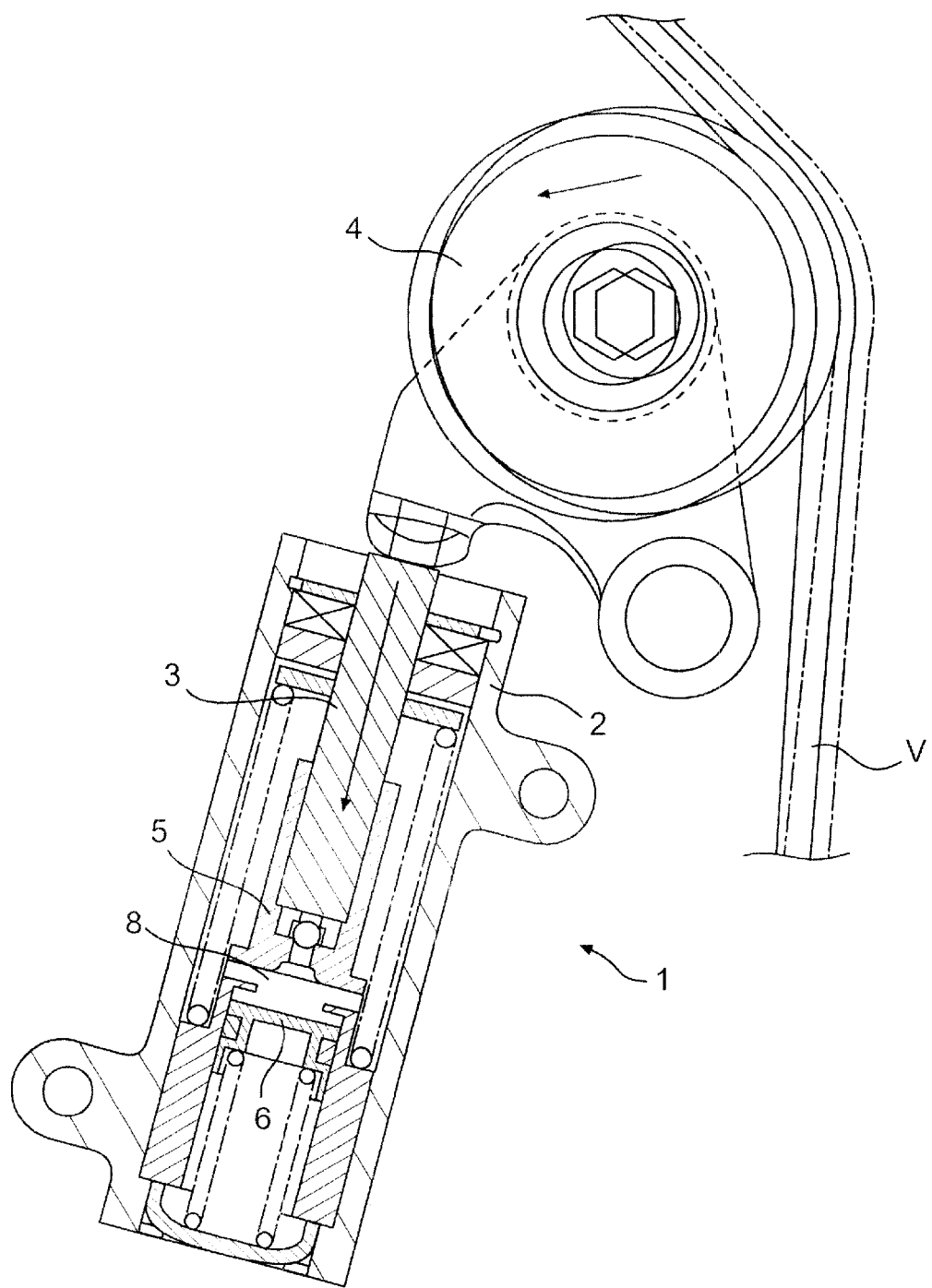
FIG. 2 is a view showing an operation of the auto-tensioner shown in FIG. 1.
Figure 3:
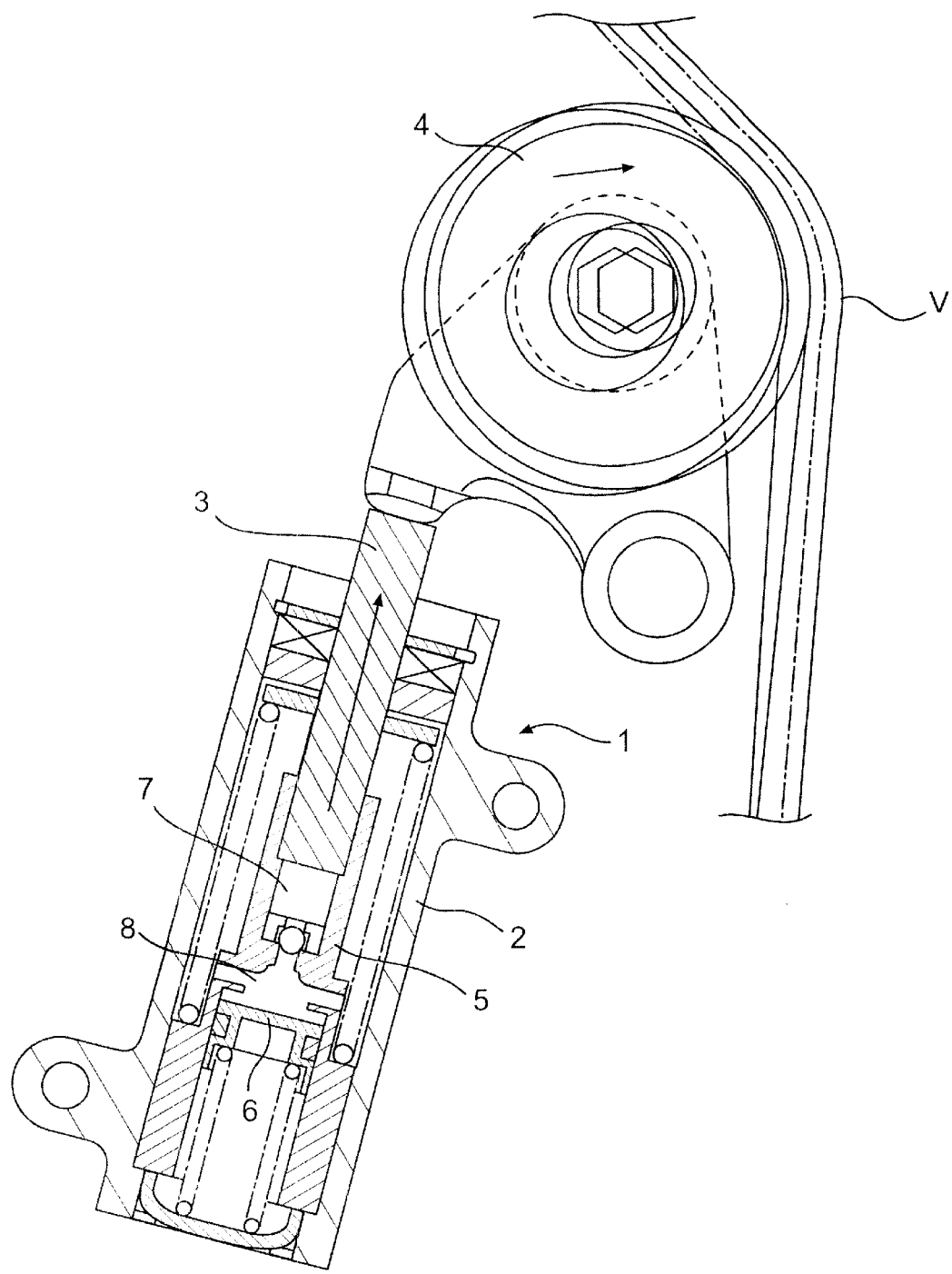
FIG. 3 is a view showing another operation of the auto-tensioner shown in FIG. 1.

First of all, with reference to FIGS. 1 through 3, there is illustrated a free piston type auto-tensioner 1 in accordance with a first embodiment of the present invention. The auto-tensioner 1 is used to provide a continual adequate tension to a timing-belt V via an idler pulley 4 which is in engagement therewith. The timing-belt V is a power transmission member for transmitting power from an engine crank shaft (not shown) to a cam shaft (not shown) as well known.

The auto-tensioner 1 includes a cylindrical body 2, a rod 3 fitted in the body 2 so as to be moved back and forth along its axial direction and extending from the body 2 for urging the timing belt V via the idler pulley 4, a block 5 provided in the body 2 and having an upper end portion receiving therein the is rod 3 and defining a first fluid chamber 7 therebetween and a lower end portion receiving therein a piston 6 and defining a second chamber 8 therebetween, and a passage 9 connecting between the a first fluid chamber 7 and the second fluid chamber 8, a first urging member 10 formed into a hollow configuration, positioned between an inner surface of the body 2 and an outer surface of the block 5 for urging the rod 3 to extend the same outside the body 2, a second urging member 11 for urging the piston 6 to increase an inner pressure of the second fluid chamber 8, and a damping means for moving the idler pulley 4 by controlling a fluid communication between the fluid chambers 7 and 8.

The rod 3 is fixed with a flange 3a which extends outwardly in the radial direction. Disposing the first urging member 10 between the flange 3a and a lower extension 5a of the block 5 causes the continual biasing of the rod 3 to extend the same outside the body 2. A sealing member 14 is provided between the body 2 and the rod 3 for preventing a leakage of a fluid from the body 2. In addition, a guide member 15 is positioned adjacent to a lower side of the sealing member 14 so as to regulate radial movements of the rod 3.

The block 5 which is fitted at its lower extension 5a is snugly fitted in the body 2, the passage 9 between the fluid chambers 7 and 8, a check-valve or one way valve 12 disposed in the passage 9 by which fluid flows from the chamber 8 to the chamber 7 and from the chamber 7 to the chamber 8 are permitted and prevented, respectively, a sliding gap 13 between the rod 3 and the body 5 constitute the damping means which will be detailed later. The sliding gap 13 has a flow passage area which is much smaller than that of the passage 9 and from the sliding gap 13 the fluid in the chamber 7 is excluded gradually when the pressure in the chamber 7 is increased.

As noted above, the piston 6 constitutes the second fluid chamber 8 together with the lower extension 5a of the block 5. Arranging the piston 6 at an opposite side of the rod 3 provides the piston 6 with only a seal ring 16 for establishing a sealing engagement between the piston 6 and the lower extension 5a of the block 5, which causes decreasing the number of seal rings in comparison with the conventional auto-tensioner, thereby restricting an increase in production costs.

The second urging member 11 has an outer radius which is set to be smaller than an inner radius of the first urging member 10, which enables a parallel arrangement of both urging members 10 and 11 in the axial direction, thereby shortening a whole or total length of the auto-tensioner 1.

In operation, when the tension of the timing belt V increases, the rod 3 is lowered or moved downwardly as indicated with an arrow in FIG. 2, thereby increasing the pressure in the first fluid chamber 7. At this time, due to the fact that the check-valve 9 prevents the fluid flow from the first fluid chamber 7 to the second fluid chamber 8, the fluid in the first fluid chamber 7 passes through the sliding gap 13 between the rod 3 and the block 5 and flows into an inner space 17 of the body 2 gradually which is constituted by the sealing member 14, the inner surface of the body 1754, the block 5, and the piston 6. The inner space 17 is in fluid communication with the second fluid chamber 8 and the piston 6 is lowered corresponding to the lowered degree of the rod 3 into the inner space 17. Thus, the tension of the timing belt V is slackened, thereby releasing the increased tension of the timing belt V. In such a state, the rod 3 is at the illustrated position in FIG. 2.

When the tension of the timing belt V decreases, the first urging force 10 moves the rod 3 in the upward direction as indicated with an arrow in FIG. 3, and the slacked tension of the timing belt V is compensated. Upon upward movement of the fluid, pressure in the first fluid chamber 7 becomes lower than the pressure in the second fluid chamber 8, thereby flowing the fluid in the second fluid chamber 8 into the first fluid chamber through the check-valve 12 in the passage 9. At this time, the piston 6 is moved by a distance in the upward direction by being biased by the second urging member 11 and the upward distance of the piston 6 corresponds to the extended stroke of the rod 3 outside the body 2. In such a situation, the rod 3 is at the illustrated position in FIGS. 1 and 3.

As apparent from the above explanation, the idler pulley 4 is moved quickly and gradually by the rod 3 when the timing-belt V is slacked and tensioned, respectively. Thus, the forgoing damping operation of the rod 3 adjusts the tension of the timing belt V to a desired value.

In addition, it is to be noted that even though unexpected air bubbles are in the first pressure chamber 7, the bubbles move through the sliding gap 13 in the upward direction when the rod 3 is moved down. Thus, the bubbles are excluded from the first pressure chamber 7, which causes no malfunction of the damping operation.

Figure 4:
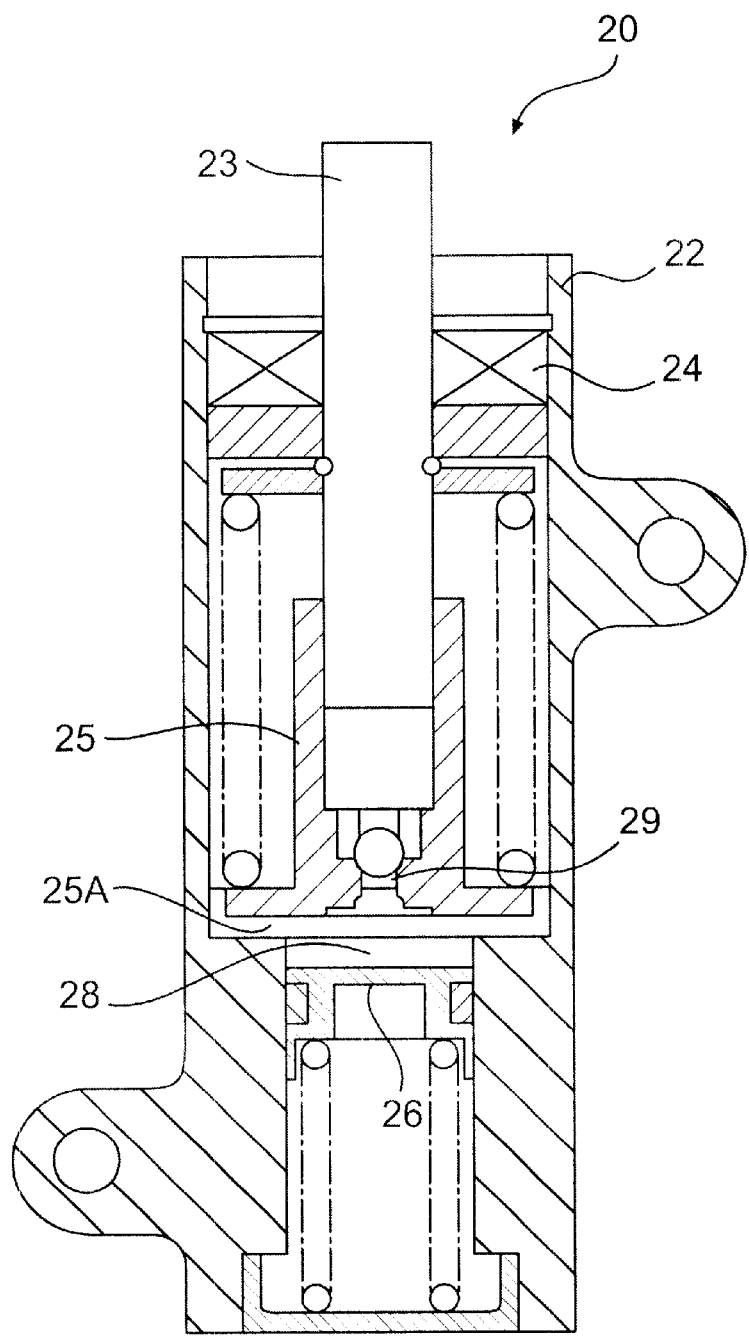
FIG. 4 is a cross-sectional view of an auto-tensioner of a second embodiment of the present invention.

Referring next to FIG. 4, there is illustrated an auto-tensioner 20 according to a second embodiment of the present invention. The auto-tensioner 20 is identical to the auto-tensioner 1 except that holding method of a block 25 and a piston 26.

In this embodiment, the piston 26, an inner surface of a body 22, and a lower end of the block 25 defines a second fluid chamber 28. The piston 26 is in slidable engagement with a lower portion of the inner surface of the body 22. On an outer face which is in sliding contact with the inner surface of the body 22 and a lower end of the block 25, there are provided a plurality of grooves 25A which are continuous with a passage 29 in the block 25, and which establish a fluid flow of a fluid from a first fluid chamber 27 into the second fluid chamber 28 opposite the piston 26.

Employing such a structure, the block 25 becomes more simplified than the structure shown in FIGS. 1 through 3, thereby decreasing the labor for the production of the block 25.

In this structure, for allowing a radial movement of the block 25 in the body 22, an outer radius of the block 25 is set to be smaller than an inner radius of the body 22. Such a structure enables an automatic alignment between the rod 23 and the guide despite initial misalignment therebetween. Thus, the sliding direction of the rod 23 becomes substantially parallel to the axis of the body 22 , thereby assuring smooth movements of the rod 23 relative to the block 25.

Figure 5:
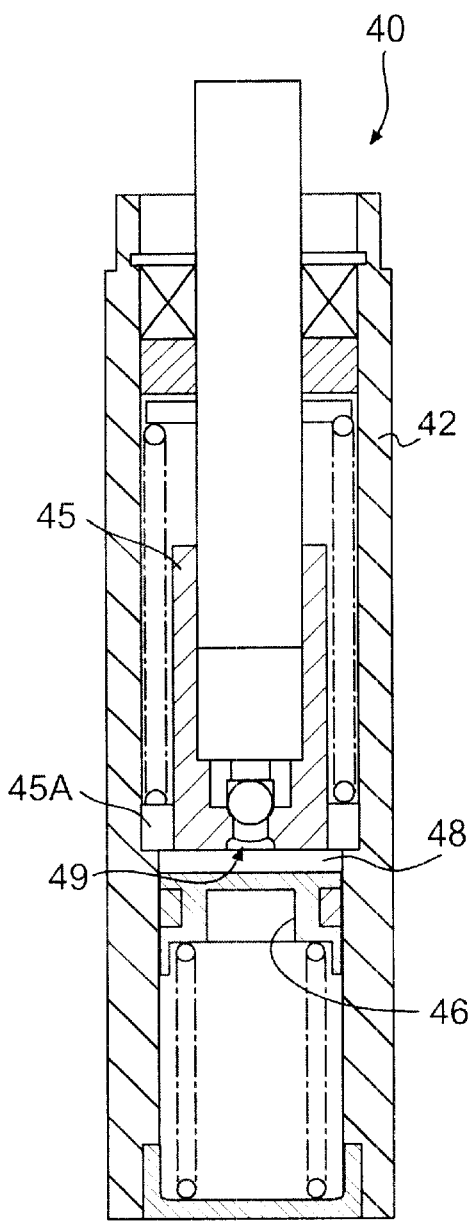
FIG. 5 is a cross-sectional view of an auto-tensioner of a third embodiment of the present invention.

Referring to FIG. 5, there is illustrated a free piston type auto-tensioner 40 in accordance with a third embodiment of the present invention. The auto-tensioner 40 is identical to the auto-tensioner 20 except that the former is not provided with slits at its lower end.

The block 45 is provided only at its sliding surface with a plurality of grooves 45A which engages with the inner surface of the body 42. The slits 45A are in fluid communication with a second fluid chamber 48 defined between the block 45 and the piston 46. The lower end of the block 45 is not formed with grooves which are in continuous contact with a passage 49, which causes decreasing of an axial thickness of the block 45, thereby shortening the whole or total length of the auto-tensioner 40.

Figure 6:
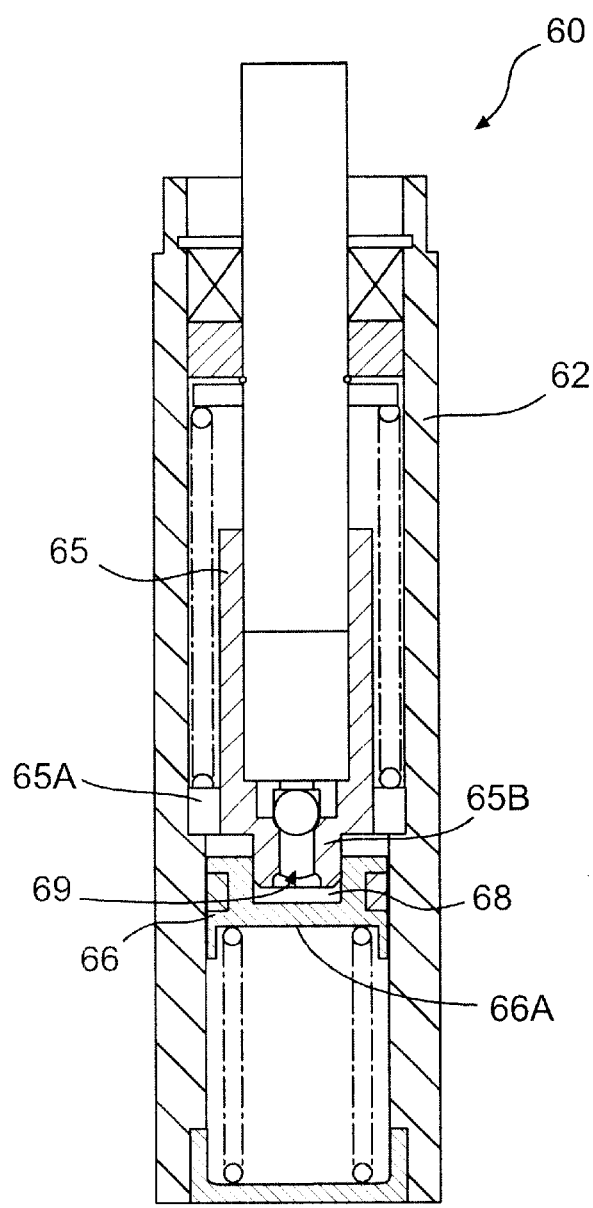
FIG. 6 is a cross-sectional view of an auto-tensioner of a fourth embodiment of the present invention.

With reference to FIG. 6, a free piston type auto-tensioner 60 is illustrated which is a fourth embodiment of the present invention. The auto-tensioner is different from the auto-tensioner 40 in the shape of block and piston.

In this embodiment, a central thin-walled portion 66A of a piston 66, an inner surface of the body 62, and a block 65 constitute a second fluid chamber 68. A passage 69 is formed in the block 65 so as to extend toward the thin-walled portion 66A of the piston 66. The piston 66 is provided with a plurality of slits 65A which are identical to those in the third embodiment. The slits 65A are in fluid communication with the second fluid chamber 68 opposite to the piston 66. In such a structure, no grooves are formed in the lower end of the block 65 which are in continuous contact with the passage 69. The lower end of the block 65 has an extension 65B through which the passage 69 passes due to the fact that the passage 69 has to pass through a portion having a sufficient thickness. However, such an extension 65B is received in and is coaxial with the piston 66. Such an arrangement fails to extend the sum of the block 65 and the piston 66 in length, thereby shortening the whole or total length of the auto-tensioner 60.

Figure 7:
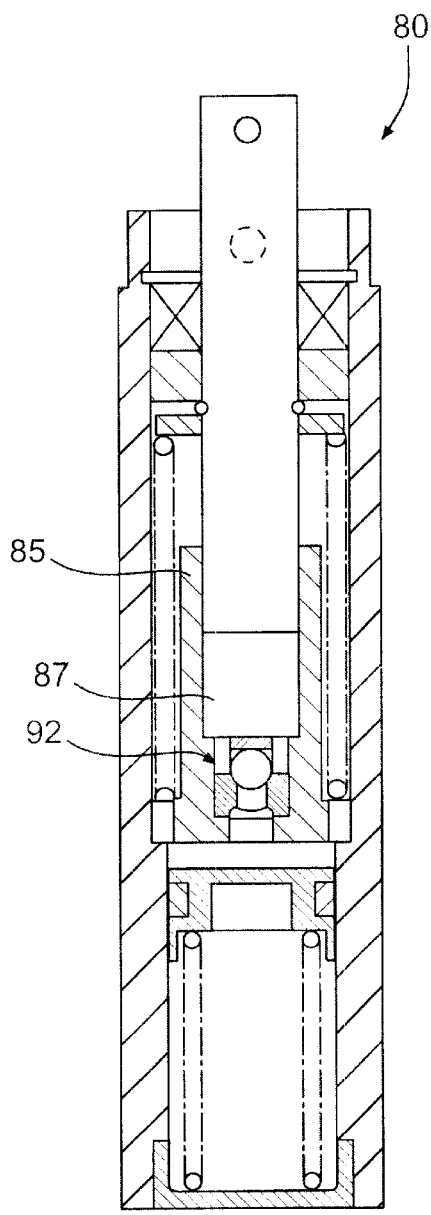
FIG. 7 is a cross-sectional view of an auto-tensioner of a fifth embodiment of the present invention.
Figure 8:
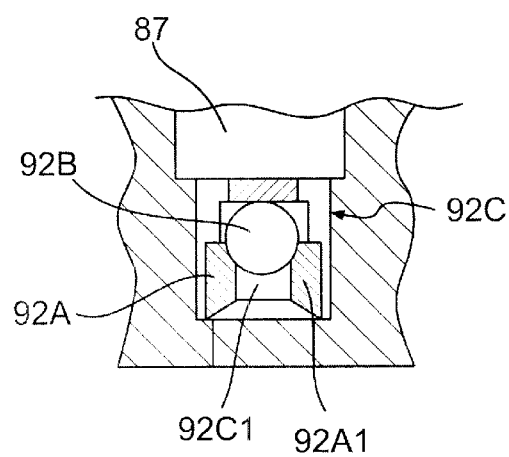
FIG. 8 is an enlarged cross-sectional view of a check-valve employed in the auto-tensioner shown in FIG. 7.

Referring to FIGS. 7 and 8, there is illustrated a free piston type auto-tensioner 80 in accordance with a fifth embodiment of the present invention. The auto-tensioner 80 is identical to the auto-tensioner 20 shown in FIG. 4 except that the former has a different designed check-valve 92.

The check-valve 92 includes seat member 92A which is an separated from a block 85, a ball 92B which rests on a seat surface 92A1 of the member 92A, an a retainer 92C positioned adjacent to a first pressure chamber 87 for restricting an upward movement of the ball 92B. An inside dimension of the block 85 is set to be larger than an outer dimension of the seat member 92A. The retainer 92C is provided at its outer surface with a slit 92C1 for permitting a fluid flow into the first pressure chamber 87 when the ball 92B is above the seat surface 92A1. In such a configuration, the seat member 92A and the block 85 are in the form of two different members in separation, which enables a very precise formation of the seat surface 92A1. In addition, press-fitting the retainer 92C in the block 85 establishes a fluid-tightly between the retainer 92C and the block 85 and the retainer 92C prevents movements of the ball 92B and the seat member 92A toward the first pressure chamber 87, thereby decreasing the outer dimension of the seat member 92A, as compared to the inner dimension of the block 85. Thus, no highly precise finish formation of the outer dimension of the seat member 92A is requested, which thereby causes an easy production thereof and an easy assembly of the seat member 92A.

With reference to FIG. 9, there is illustrated a free piston type auto-tensioner 100 in accordance with a sixth embodiment of the present invention. The auto-tensioner 100 is identical to the auto-tensioner 20 shown in FIG. 4 except that the former has a different structure for supporting a first urging member 110.

Tapered portions 103b and 105b are formed at a flanged 103a and a block 105, respectively, and between the tapered portions 103b and 105b the first urging member 110 is interposed, which causes a centering of the first urging member 110. Thus, it becomes possible to prevent an interface or a frictional engagement of the first urging member 110 with any one of a rod 103, a block 105, and a body 102, thereby prolonging the durability and reliability of the auto-tensioner 100. It is to be noted that either of the tapered portions 103b and 105b can be omitted.

With reference to FIG. 10, there is illustrated a free piston type auto-tensioner 120 in accordance with a seventh embodiment of the present invention. The auto-tensioner 120 is identical to the auto-tensioner 20 shown in FIG. 4 except that in the former, an additional structure is provided.

A spherical member 138 is provided in a separate manner at a lower side of a rod 123. The spherical member 138 is in a first pressure chamber 127 and supported by a spring 139. A force from a belt via the rod and an urging force from the spring 139 establishes a continual contact between the rod 123 and the spherical member 138. Such an arrangement, even though the rod 123 is applied with a force whose direction is perpendicular thereto, allows such a force fails to be transmitted to the spherical member 138, which lessens an interface of the rod 123 with an inner surface of the block 125, thereby improving the durability of the auto-tensioner 120. In addition, no precise formation is required in the inner surface of the block 125, which makes the production of the device easy. Moreover, minimum frictional wear can be attained between the inner surface of the block 125 and the spherical member 138 due to the fact that the block 125 and the spherical member 138 are in rolling contact relationship.

The invention has thus been shown and described with reference to specific embodiments, however, it should be understood that the invention is in no way limited to the details of the illustrated structures but changes and modifications may be made without departing from the scope of the appended claims.

What is claimed is:

1. A free piston auto-tensioner for providing a continual adequate tension to a belt-shaped power transmission member comprising:

a cylindrical body;

a rod fitted in the body so as to be moved back and forth along its axial direction, extending outside the body so as to urge the belt-shaped power transmission member via an idler pulley;

a block placed in the body and having one end portion and the other end portion, one end portion of the block receiving the rod movably and defining therein a first fluid chamber together with the rod for storing a fluid, the other end portion defining a second fluid chamber together with a movable piston which is moved by a distance corresponding to a stroke of the rod;

a first urging member formed into a hollow configuration and urging the rod to extend the same outside the body and disposed between an outer surface of the block and an inner surface of the body;

a second urging member formed into a cylindrical configuration and making the piston pressurize the fluid in the second fluid chamber so as to compensate for the total inside volume defined by the first fluid chamber, the second fluid chamber and an inner space of the body which is in fluid communication with the first and second fluid chambers; and damping means for controlling a fluid communication between the first fluid chamber and the second fluid chamber so as to adjust an engagement of the idler pulley with the belt-shaped power transmission member in such a manner that when a tension thereof is decreased a quick propulsive movement of the idler pulley to the belt-shaped power transmission member is allowed by the first urging member, while when the tension is increased, the idler pulley is retracted gradually from the belt-shaped power transmission member by a registration of the belt-shaped power transmission member, the damping means includes one or more sliding gaps provided between the block and the rod so as to connect the first fluid chamber and the second fluid chamber via the inner space of the body.

2. An auto-tensioner as set forth in claim 1, wherein the damping means include a first fluid passage provided with a check-valve for allowing and preventing the fluid flow into the first fluid chamber from the second fluid chamber and into the second chamber from the first fluid chamber, respectively, and a second passage disposed between the rod and the block for allowing the fluid to flow from the first fluid chamber to the second fluid chamber via a space.

3. An auto-tensioner as set forth in claim 2, wherein the check-valve includes a seat member which is separate from the block, a ball resting on a seat surface of the seat member, and a retainer positioned at a side of the first fluid chamber in order to restrict a movement of the ball.

4. An auto-tensioner as set forth in claim 3, wherein an outer dimension of the seat member is smaller than an inner dimension of the block.

5. An auto-tensioner as set forth in claim 1, wherein an outer radius of the second urging member is smaller than an inner radius of the first urging member.

6. An auto-tensioner as set forth in claim 5, wherein the first urging member and the second urging member are arranged in parallel along an axial direction of the body.

7. An auto-tensioner as set forth in claim 1, wherein the second fluid chamber is constituted by the piston, an inner surface of the body, and the other end portion of the block, and the piston is in sliding e with the inner surface of the body.

8. An auto-tensioner as set forth in claim 7, wherein the block is movable in the radial direction in the body.

9. An auto-tensioner as set forth in claim 8, wherein the piston has at its central portion a thin-walled portion, and a projection in which the fluid passage is formed is extended from the block toward the thin-walled portion.

10. An auto-tensioner as set forth in claim 1, wherein the second fluid chamber is defined between the piston and the other end portion of the block.

11. An auto-tensioner as set forth in claim 1; wherein the piston is slidably fitted in the other end portion of the block.

12. An auto-tensioner as set forth in claim 1, wherein the first urging member is interposed between a flange of the rod and the block in such a manner that at least one of the flange of the rod and the block is provided with a tapered portion for receiving an end of the first urging member.

13. An auto-tensioner as set forth in claim 11 wherein the rod is provided with a separate sliding member at a side of the first fluid chamber.

14. A free piston auto-tensioner for providing a continual adequate tension to a belt-shaped power transmission member comprising:

a cylindrical body;

a rod fitted in the body so as to be moved back and forth along its axial direction, extending outside the body so as to urge the belt-shaped power transmission member via an idler pulley;

a block placed in the body and having one end portion and the other end portion, one end portion of the block receiving the rod movably and defining therein a first fluid chamber together with the rod for storing a fluid, the other end portion defining a second fluid chamber together with a movable piston which is moved by a distance corresponding to a stroke of the rod;

a first urging member formed into a hollow configuration and urging the rod to extend the same outside the body and disposed between an outer surface of the block and an inner surface of the body;

a second urging member formed into a cylindrical configuration and making the piston pressurize the fluid in the second fluid chamber;

an inner space of the body defined by the body, the rod, the block and seal means provided between the body and the rod; and damping means for controlling a fluid communication between the first fluid chamber and the second fluid chamber so as to adjust an engagement of the idler pulley with the belt-shaped power transmission member in such a manner that when a tension thereof is decreased a quick propulsive movement of the idler pulley to the belt-shaped power transmission member is allowed by the first urging member, while when the tension is increased, the idler pulley is retracted gradually from the belt-shaped power transmission member by a registration of the belt-shaped power transmission member, the damping means includes one or more sliding gaps provided between the block and the rod so as to connect the first fluid chamber and the second fluid chamber via the inner space of the body.

* * * * *